United States Patent
Zhang et al.

(10) Patent No.: US 11,671,890 B2
(45) Date of Patent: Jun. 6, 2023

(54) TIMING ADVANCE GROUP REPORTING FOR LAYER 1/LAYER 2-CENTRIC INTER-CELL MOBILITY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/129,556

(22) Filed: Dec. 21, 2020

(65) Prior Publication Data
US 2021/0195491 A1    Jun. 24, 2021

Related U.S. Application Data

(60) Provisional application No. 62/953,159, filed on Dec. 23, 2019.

(51) Int. Cl.
| | |
|---|---|
| *H04W 36/14* | (2009.01) |
| *H04W 36/00* | (2009.01) |
| *H04W 80/02* | (2009.01) |
| *H04W 76/11* | (2018.01) |
| *H04W 56/00* | (2009.01) |

(52) U.S. Cl.
CPC ....... *H04W 36/14* (2013.01); *H04W 36/0058* (2018.08); *H04W 56/0045* (2013.01); *H04W 76/11* (2018.02); *H04W 80/02* (2013.01)

(58) Field of Classification Search
CPC . H04W 36/14; H04W 76/11; H04W 36/0058; H04W 56/0045; H04W 80/02
USPC ........ 370/343, 328, 329, 338, 341, 345, 350
See application file for complete search history.

(56) References Cited

U.S. PATENT DOCUMENTS

| | | | |
|---|---|---|---|
| 2009/0119655 A1* | 5/2009 | Quilty | ....................... G06F 8/65 717/168 |
| 2013/0064165 A1 | 3/2013 | Chen et al. | |
| 2018/0332558 A1* | 11/2018 | Chan | .................... H04B 17/318 |
| 2020/0096596 A1* | 3/2020 | An | ............................ G01S 3/40 |

FOREIGN PATENT DOCUMENTS

| | | |
|---|---|---|
| EP | 3046377 A1 | 7/2016 |
| WO | 2012041422 A2 | 4/2012 |
| WO | 2014114261 A1 | 7/2014 |

OTHER PUBLICATIONS

International Search Report and Written Opinion—PCT/US2020/066691—ISA/EPO—dated Apr. 15, 2021.

* cited by examiner

*Primary Examiner* — Nghi H Ly
(74) *Attorney, Agent, or Firm* — Loza & Loza, LLP

(57) ABSTRACT

Aspects of the disclosure relate to Layer 1/Layer 2-centric inter-cell mobility systems and determining timing advance groups (TAGs) within such systems. User equipment (UE) are configured to report one or more grouping of cells to a radio access network (RAN), where the cells for each group have similar propagation delays and/or signal quality. Each reported group can be assigned to a TAG identifier (ID) by the RAN. The RAN may utilize the TAG IDs to time division multiplex uplink and/or downlink transmissions based on the TAG IDs.

17 Claims, 10 Drawing Sheets

TIMING ADVANCE GROUP REPORTING FOR LAYER 1/LAYER 2-CENTRIC INTER-CELL MOBILITY

PRIORITY CLAIM

This application claims priority to and the benefit of provisional application No. 62/953,159 filed in the U.S. Patent and Trademark Office on Dec. 23, 2019, the entire contents of which are incorporated herein by reference as if fully set forth below in its entirety and for all applicable purposes.

TECHNICAL FIELD

The technology discussed below relates generally to wireless communication systems, and more particularly, to timing advance group (TAG) reporting in layer 1 (L1)/layer 2 (L2)-centric inter-cell mobility systems.

INTRODUCTION

In wireless technologies and standards such as the evolving 3GPP 5G New Radio (NR) standard, particular high frequency transmission waveforms and protocols, as well as the use of multiple transmission/reception points (multi-TRP) have been proposed. Furthermore, 5G NR standards continue to provide enhancements for multi-beam operation, particularly for high frequency transmissions (e.g., frequency range FR2, which encompass approximately 6 GHz and above), as well as for multi-TRP deployments. Some further enhancements in 5G NR include improving inter-cell mobility, which is a procedure that ensures that a wireless user equipment (UE) is able to hand-off from one wireless cell to another wireless cell whenever the UE detects an adjacent wireless cell capable of serving the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

According to an aspect, a method for wireless communication at a radio access network (RAN) entity in a wireless communication network supporting inter-cell mobility is disclosed. The method includes receiving at least one of propagation delay or signal quality concerning one or more cells in the wireless communication network from a user equipment (UE). Further, the method includes grouping at least a portion of the one or more cells into a group of cells based on the received propagation delay information or the signal quality information, wherein the cells in the group of cells have substantially the same propagation delay or signal quality, and time division multiplexing (TDM) at least one of downlink (DL) and uplink (UL) transmissions based on the group of cells.

According to another aspect, a radio access network (RAN) entity configured for wireless communication is disclosed having a processor, a transceiver communicatively coupled to the processor, and a memory communicatively coupled to the processor. The processor and the memory are configured to receive at least one of a propagation delay or a signal quality concerning one or more cells in the wireless communication network from a user equipment (UE). Further, the processor and the memory are configured to group at least a portion of the one or more cells into a group of cells based on the received propagation delay information or the signal quality information, wherein the cells in the group of cells have substantially the same propagation delay or signal quality, and time division multiplex (TDM) at least one of downlink (DL) and uplink (UL) transmissions based on the group of cells.

According to another aspect, a method for wireless communication in a user equipment (UE) in a wireless communication system supporting inter-cell mobility is disclosed. The method includes determining at least one of propagation delay or signal quality information for one or more cells in the communication system. Further, the method includes grouping the one or more cells into one or more groups of cells based on the determined propagation delay or signal quality information, wherein cells having shared propagation delays or signal quality are grouped together. Moreover, the method includes transmitting a report of the grouped one or more groups of cells to a RAN entity.

In yet another aspect, a user equipment (UE) configured for wireless communication is disclosed having a processor, a transceiver communicatively coupled to the processor, and a memory communicatively coupled to the processor. The processor and the memory are configured to determine at least one of a propagation delay or a signal quality information for one or more cells in a communication system, group the one or more cells into one or more groups of cells based on the determined propagation delay or signal quality information, wherein cells having shared propagation delays or signal quality are grouped together, and transmit a report of the grouped one or more groups of cells to a RAN entity.

These and other aspects of the invention will become more fully understood upon a review of the detailed description, which follows. Other aspects, features, and examples will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples it should be understood that such exemplary examples can be implemented in various devices, systems, and methods.

DETAILED DESCRIPTION

Figure 1:
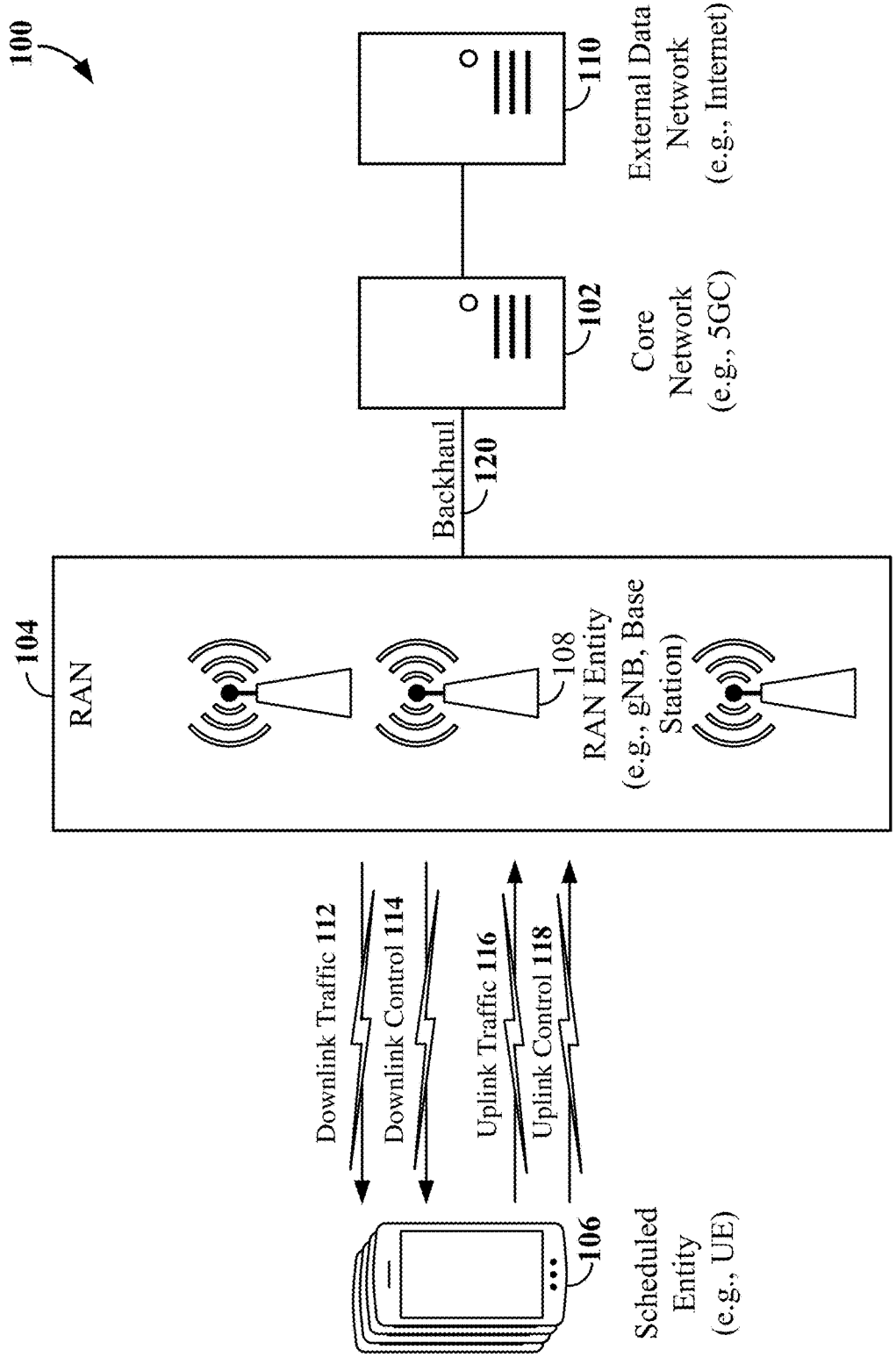
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided based on frequency and wavelength into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Turning to the drawings, the various concepts presented throughout this disclosure may be implemented across a broad variety of telecommunication systems, network architectures, and communication standards. Referring to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a RAN entity 108, which may be one or more base stations, gNBs, or RRHs. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device, a logistics controller, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
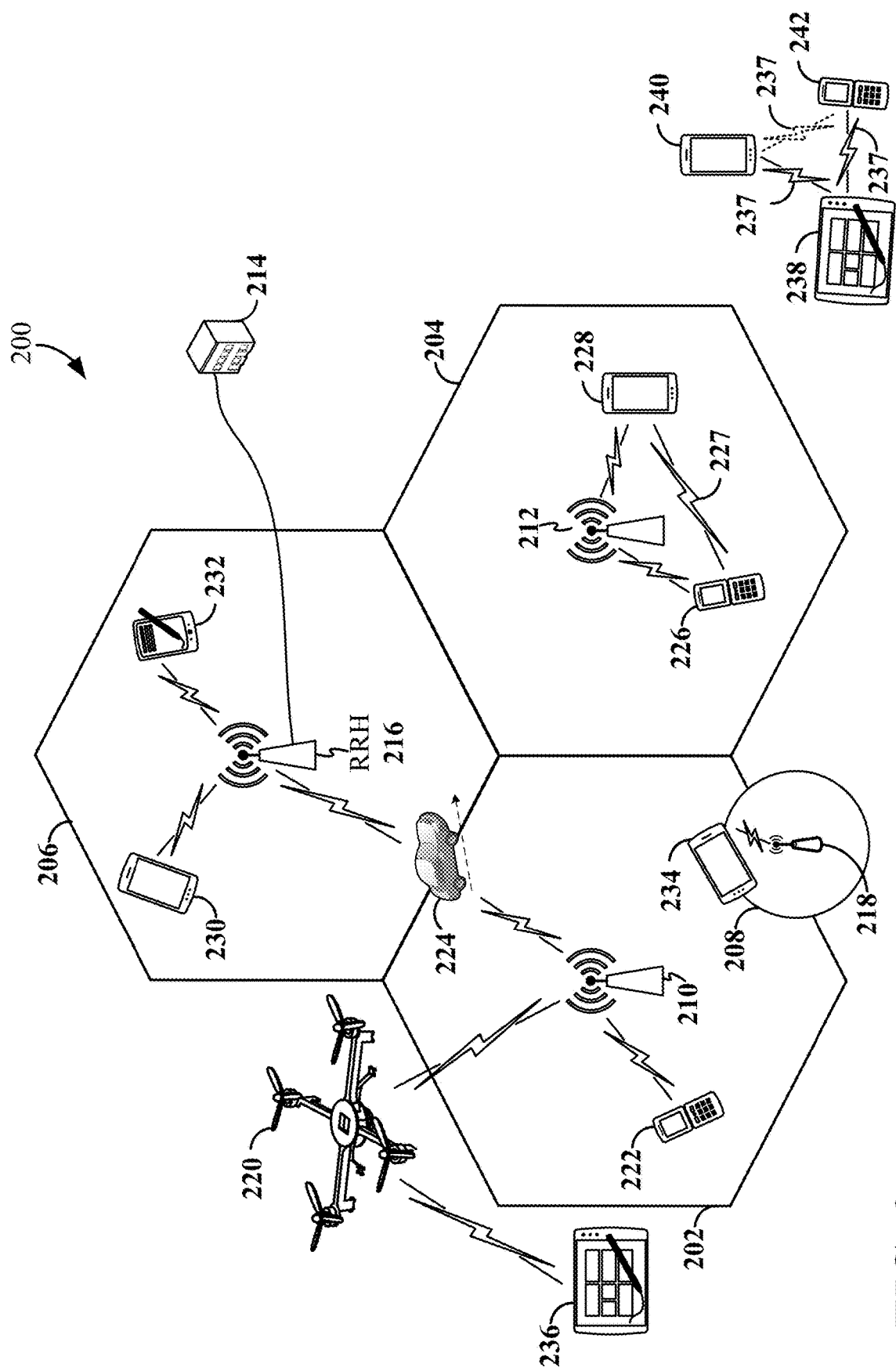
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown).

A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
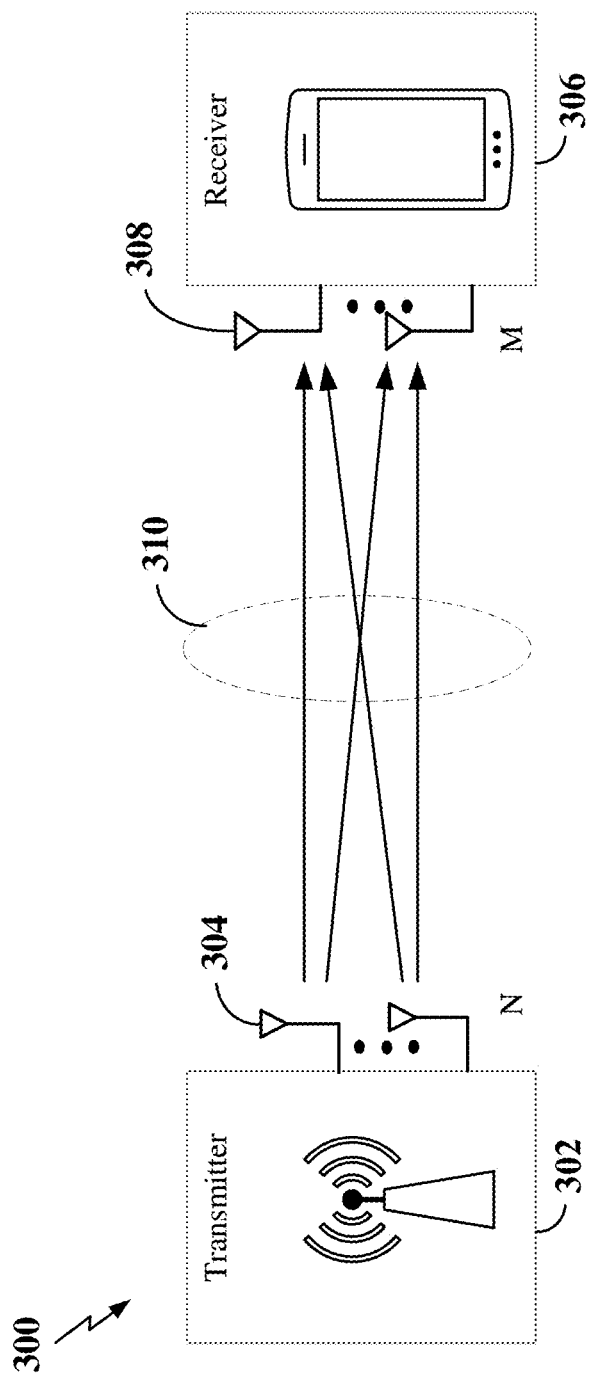
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Figure 4:
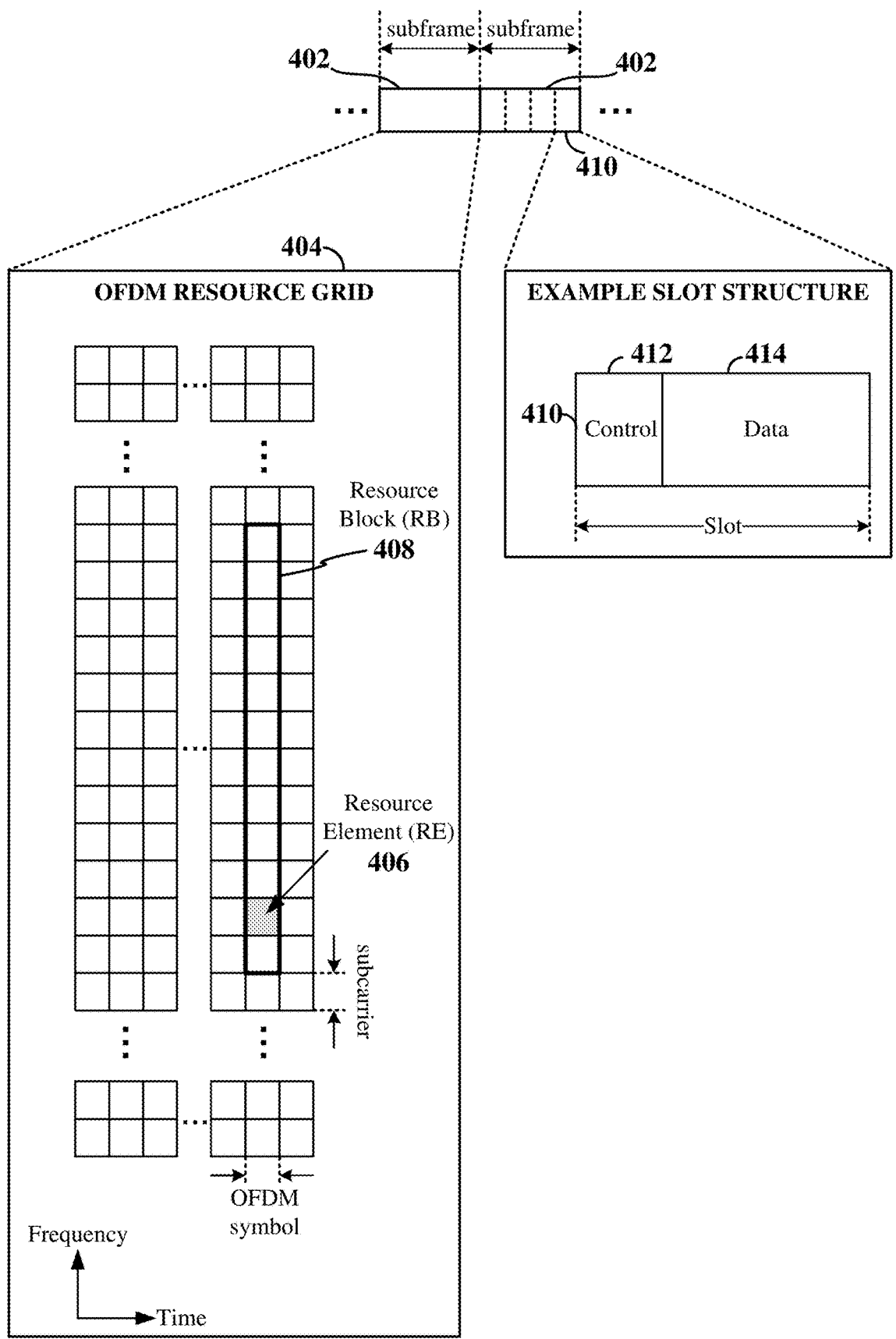
FIG. 4 is a schematic illustration of an organization of wireless resources in an air interface utilizing orthogonal frequency divisional multiplexing (OFDM) according to some aspects.

Various aspects of the present disclosure utilize an OFDM waveform, an example of which is schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs (e.g., scheduled entities) for downlink or uplink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB and/or a sidelink CSI-RS, may be transmitted within the slot 410.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Concerning multi-beam operation of the apparatus in FIG. 2, for example, enhancements in 5G NR for multi-beam operation have targeted FR2 frequency bands, but are also applicable to the FR1 frequency bands. These enhancements have been provided to facilitate more efficient (i.e., lower latency and overhead) DL/UL beam management to support higher intra-cell and L1/L2-centric inter-cell mobility and a larger number of configured transmission configuration indicator (TCI) states. These enhancements may be effected by providing a common beam for data and control transmission/reception for DL and UL, especially for intra-band carrier aggregation (CA). Also, enhancements may be engendered with a unified TCI framework for DL and UL beam indication. Further, enhancements concerning signaling mechanisms for these features can improve latency and efficiency through greater usage of dynamic control signaling as opposed to RRC signaling. Also, enhancements for multi-beam operation may be based on identifying and specifying features to facilitate UL beam selection for UEs equipped with multiple panels, taking into consideration UL coverage loss mitigation due to maximum permissible exposure (MPE) limitations, and based on UL beam indication with the unified TCI framework for UL fast panel selection.

Other enhancements may be for supporting multi-TRP deployment, including targeting both FR1 and FR2 frequency bands. In particular, enhancement may focus on identifying and specifying features to improve reliability and robustness for channels other than PDSCH (i.e., PDCCH, PUSCH, and PUCCH) using multi-TRP or multi-panel with 3GPP Release16 reliability features as the baseline. Additionally, enhancements may concern identifying and specifying QCL/TCI-related enhancements to enable inter-cell multi-TRP operations, assuming multi-DCI based multi-PDSCH reception. Further, beam-management-related enhancements for simultaneous multi-TRP transmission with multi-panel reception may be provided. Still further concerning multi-TRP deployments, enhancements to support high speed train-single frequency network (HST-SFN) deployment scenarios may be provided, such as identifying and specifying solution(s) on QCL assumptions for DMRS (e.g., multiple QCL assumptions for the same DMRS port (s), targeting DL-only transmissions, or specifying QCL/QCL-like relations (including applicable type(s) and the associated requirement) between DL and UL signals by reusing the unified TCI framework.

Figure 5:
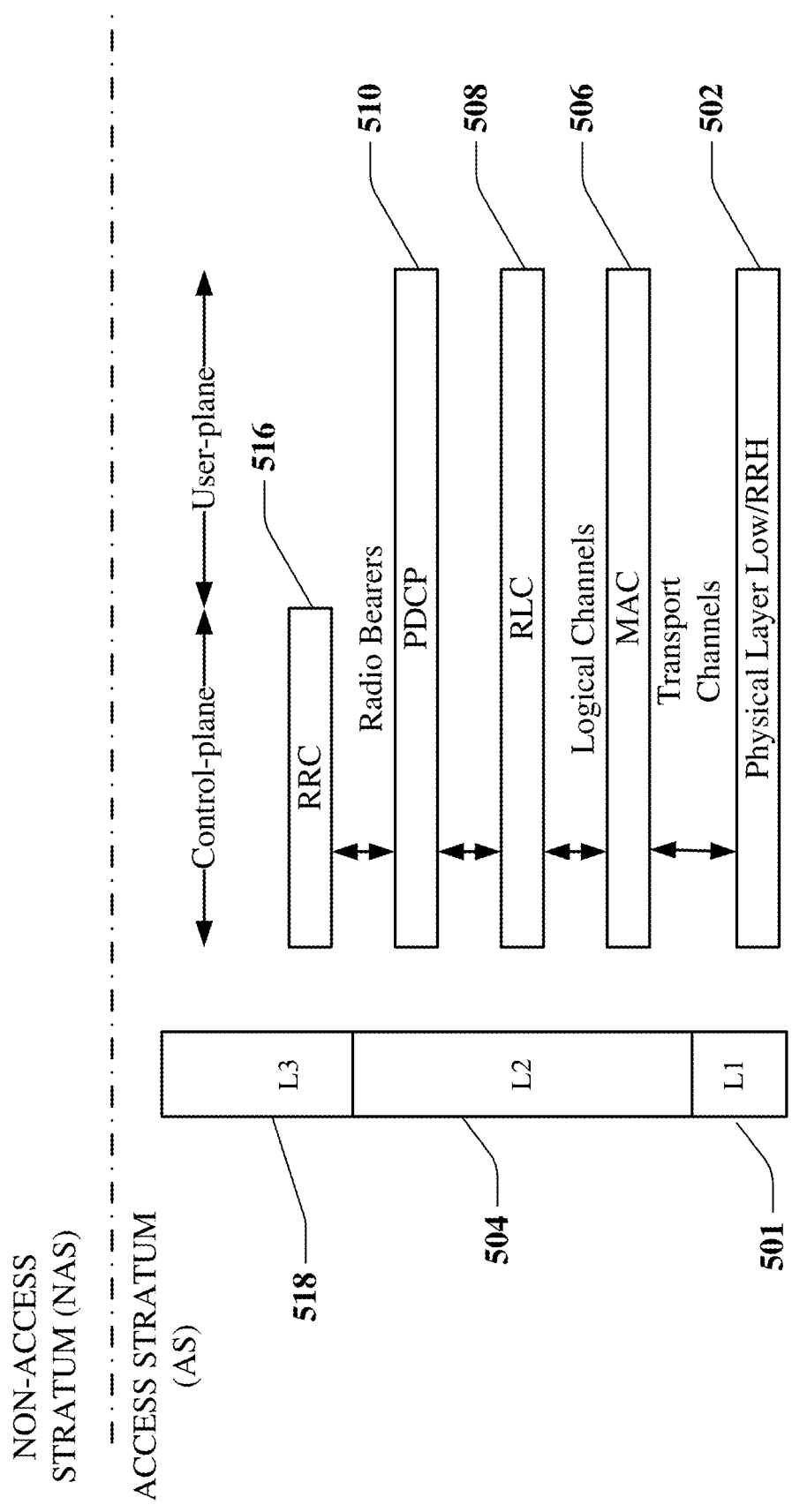
FIG. 5 illustrates a radio protocol architecture for a UE and/or gNB in which the disclosed aspects are operable.

It is further noted that according to certain aspects, the methodology disclosed herein may be implemented at the layer 1 (L1) and layer 2 (L2) levels. Turning to FIG. 5, a generalized radio protocol architecture for a gNB or a UE, but not limited to such, is shown with three layers: Layer 1, Layer 2, and Layer 3. Layer 1 501 is the lowest layer and implements various physical layer signal processing functions, as well as the remote radio head (RRH) in the case of gNBs. Layer 1 will be referred to herein as the physical layer 502 or PHY layer. Layer 2 (L2 layer) 504 is above the physical layer 501 and is responsible for the link between a UE and a gNB over the physical layer 501.

In the user and control planes, the L2 layer 504 includes a media access control (MAC) sublayer 506, a radio link control (RLC) sublayer 508, and a packet data convergence protocol (PDCP) 510 sublayer, which are terminated at the eNB on the network side. Although not shown, a gNB or a UE may have several upper layers above the Layer 2 504 including a network layer (e.g., IP layer) on the network side, and an application layer that is terminated at the other end of the connection (e.g., far end UE, server, etc.).

The PDCP sublayer 510 provides multiplexing between different radio bearers and logical channels. The PDCP sublayer 510 also provides header compression for upper layer data packets to reduce radio transmission overhead, security by ciphering the data packets, and handover support for UEs between gNBs. The RLC sublayer 508 provides segmentation and reassembly of upper layer data packets, retransmission of lost data packets, and reordering of data packets to compensate for out-of-order reception due to hybrid automatic repeat request (HARQ). The MAC sublayer 506 provides multiplexing between logical and transport channels. The MAC sublayer 506 is also responsible for allocating the various radio resources (e.g., resource blocks) in one cell among the UEs. The MAC sublayer 506 is also responsible for HARQ operations.

In the control plane, the radio protocol architecture for the UE and gNB may be substantially the same for the physical L1 layer 501 and the L2 layer 504 with the exception that there is no header compression function for the control plane. The control plane may also include a radio resource control (RRC) sublayer 516 in Layer 3 518. The RRC sublayer 516 is responsible for obtaining radio resources (i.e., radio bearers) and for configuring the lower layers using RRC signaling between the gNB and the UE.

As mentioned above, in L1/L2-centric inter-cell mobility systems, a RAN entity (e.g., a base station or gNB), such as those illustrated in FIGS. 1-3, may not know or have information about which cells have similar propagation delays for transmissions to a UE operating in the inter-cell mobility system. Nonetheless, if a RAN entity obtains such information, the entity can group cells with similar propagation delays together as one timing advance group (TAG). Additionally, the RAN entity can then perform time division multiplexing for DL/UL transmissions across the different timing advance groups (TAGs). In order to gather this information at the network (e.g., RAN entity), in some aspects a UE may be configured to report on multiple groups of cells, where the cells for each group will have similar timing characteristics (e.g., propagation delays) or signal qualities at the UE. Each reported or identified group can be assigned to one TAG ID by the RAN entity.

Furthermore, the RAN entity may configure, predetermine, or set a maximum allowed difference for propagation delays and/or signal qualities in each reported group. According to further aspects, the signal qualities reported by a UE can be represented by reference signal receive power (RSRP), signal to interference plus noise ratio (SINR), or reference signal received quality (RSRQ) values. Additionally, these values may be communicated through at least layer 1 (L1) or layer (L3) mechanisms. For example, for L1 reporting, a UE may utilize a PUCCH or a PUSCH channel for reporting the propagation delays or signal qualities. In another example of L3 reporting, this reporting may be accomplished through RRC configurations.

In still further aspects, it is noted that a UE may also be configured to report cell group information including cell IDs, absolute propagation delay values, differential propagation delay values, or a signal quality per cell, as examples, but not limited to such. Reporting by a UE may also be configured to be periodic or event triggered. In case of event triggered reporting, a UE may be configured to report the cell groups only when there is any change in any one of the cells in the group or a change in the group formation.

Figure 6:
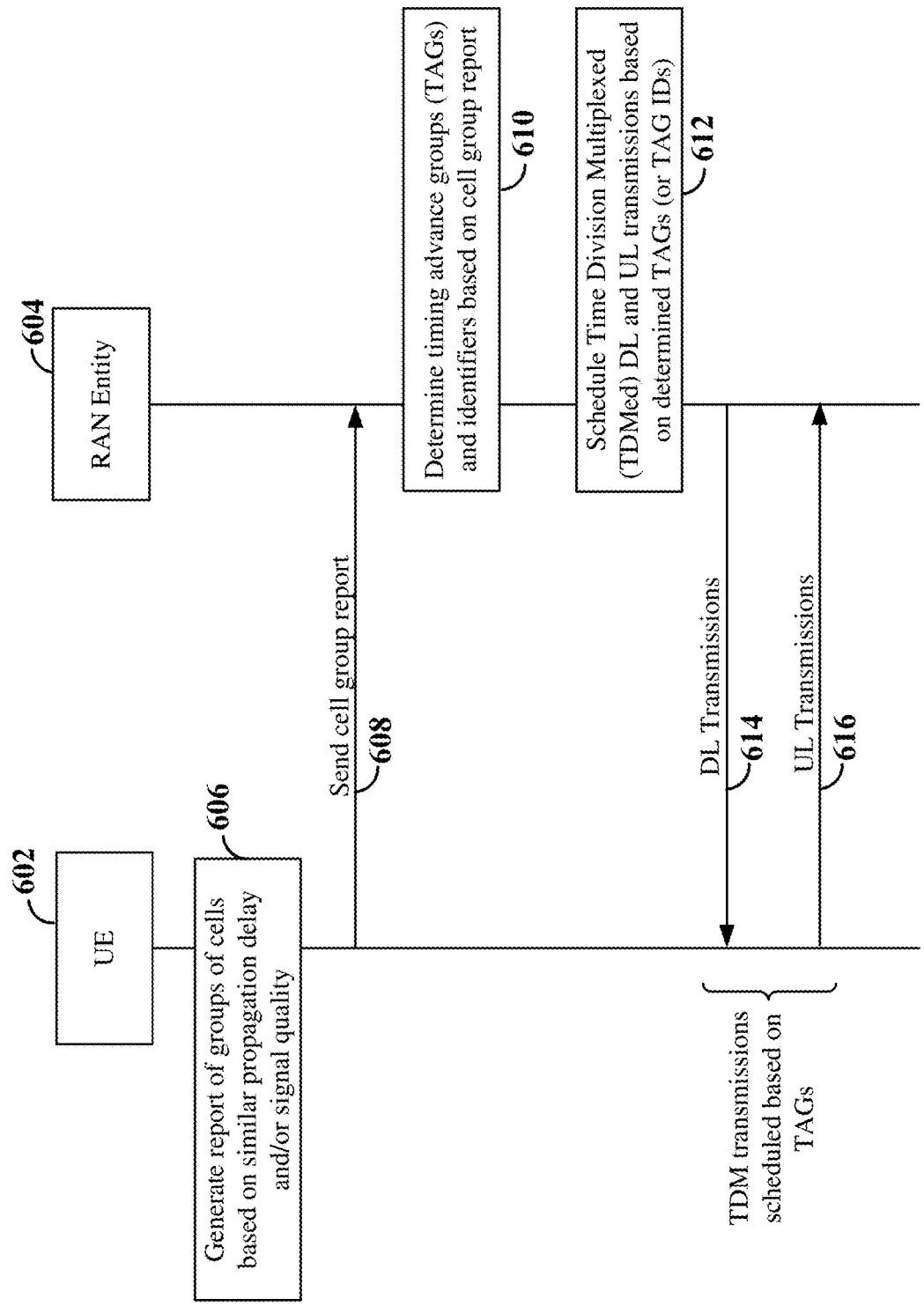
FIG. 6 is a signaling diagram illustrating an exemplary procedure for determining and using timing advance groups (TAGs) according to some aspects.

FIG. 6 is a signaling diagram illustrating an exemplary procedure for grouping cells (e.g., a TAG determination) according to some aspects. In this example, a single UE 602 and a single RAN entity 604 are illustrated in a communication network, although those skilled in the art will appreciate that the UE may be in communication with various different cells in the network including gNBs, base stations, or transmission and reception points (TRPs) effectuating a cell. Additionally, it is noted that the RAN entity 604 may be any of the base stations (e.g., gNBs) or scheduling entities illustrated in FIGS. 1-3, and the UE 602 may be any of the UEs or scheduled entities illustrated in FIGS. 1-3. Further, in other aspects the RAN entity 604 may be configured to coordinate communication among a plurality of TRPs (m TRPs), which may be collocated or non-collocated.

At 606, the UE 602 may be configured to generate a report concerning groups of cells, where the cells are grouped based on similar propagation delay and/or signal quality based on measurements performed within the UE 602. The generated report is sent to the RAN entity 604 as shown at 608. In an aspect, the UE 602 may be configured to report multiple groups of cells, where the cells per group have similar propagation delays and/or signal quality. In further aspects, concerning the reporting of the signal quality, this parameter can be represented by one of a reference signal receive power (RSRP) value, a signal to interference plus noise ratio (SINR) value, or a reference signal received quality (RSRQ) value, and transmitted on the uplink (UL) as either as an L1 or an L3 value. In other aspects, the UE 602 may be configured to send the report(s) periodically or after a predefined period (i.e., a set period). Yet in further aspects, the UE 602 may be configured to send the report(s) after some triggering event. For example, a change in the propagation delay or signal quality of a cell in a group may trigger sending the report. In yet other aspects, the RAN entity 604 may be configured to trigger the sending of the report through DL signaling. In still other aspects, each reported group may be configured to include a cell ID, an absolute or a differential propagation delay, and/or the signal quality value per each cell.

After receiving a report from the UE 602, the RAN entity 604 may be configured to assign a TAG identifier (TAG ID) to each reported group of cells as indicated at 610. In further aspects, the RAN entity 604 may set a maximum (or alternatively a range) of propagation delays and/or signal quality for assigning TAG IDs to a reported group. Thus, for example, if a propagation delay for a cell is above the maximum value, the cell is not included in the assigned TAG and associated with the TAG ID.

In other aspects, it is noted that the RAN entity 604 may utilize the TAGs or corresponding TAG IDs to schedule UL and/or DL transmissions in a time division multiplexed (TDMed) manner as indicated at 612. That is, DL transmissions (e.g., 614) and UL transmissions (e.g., 616) may be scheduled in time according to the TAGs. For example, transmissions with cell groups having a first TAG ID may be scheduled at a first time and transmission with cells groups having another, second TAG ID may be scheduled at another, second time. Of further note, while UL and DL transmissions 614 and 616 are illustrated in FIG. 6, those skilled in the art will appreciate that the UL and/or DL transmissions for various cells and UEs may be scheduled by the RAN entity 604 based on the TAGs or TAG IDs. In another aspect, while FIG. 6 illustrates that the UE 602 may transmit a report including already grouped cells, in other aspects, the RAN entity 604 may simply receive reports with propagation delays and/or signal quality parameters from the UE 602, and then decide or determine the appropriate groupings of cells for the TAGs.

Figure 7:
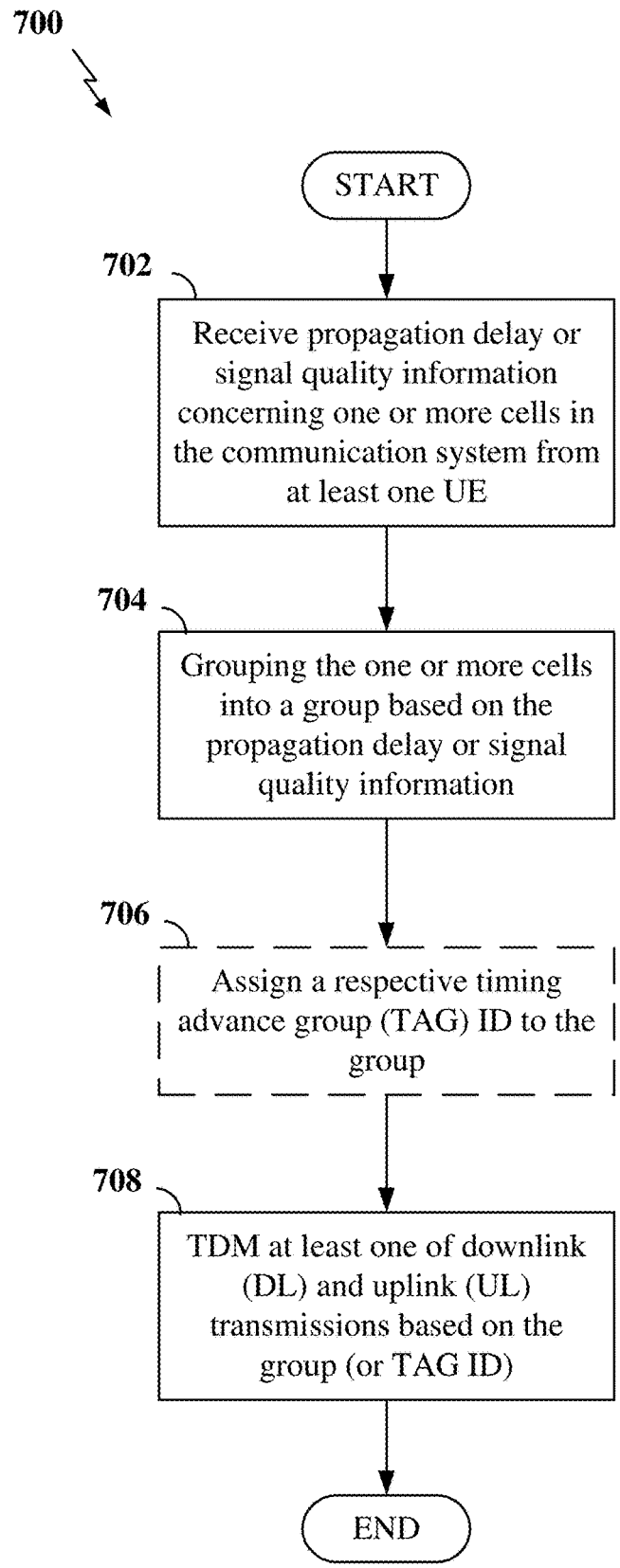
FIG. 7 illustrates a flow chart of an exemplary method for grouping cells (e.g., determining TAGs) based on various characteristics according to some aspects.

FIG. 7 illustrates a flow chart of an exemplary method 700 for grouping cells in a communication system supporting inter-cell mobility based on various characteristics in accordance with some aspects of the present disclosure. As described below, some or all illustrated features may be omitted in a particular implementation within the scope of the present disclosure, and some illustrated features may not be required for implementation of all examples. In some examples, the method 700 may be carried out by a RAN entity (e.g., any of the RAN entities as illustrated in FIG. 1-3, 6, or 8 herein), or by a combination of a RAN entity and a UE (e.g., any of the UEs illustrated in FIG. 1-3, 6, or 10 herein). In other examples, the method 700 may be carried out by any suitable apparatus or means for carrying out the functions or algorithm described below.

At block 702, method 700 includes receiving propagation delay or signal quality information concerning one or more cells in the communication system that is measured and/or collected by at least one user equipment (UE). In an example, the grouping circuit 840 in conjunction with transceiver 810 shown and described later in connection with FIG. 8 may provide a means to receive at least one of propagation delay or signal quality information.

After receiving this information from the UE, method 700 includes grouping the one or more cells into a group of cells based on the received propagation delay or signal quality information as shown in block 704. The cells in the group may have the same or substantially the same propagation delays and/or signal quality. Thus, common signal timing or quality characteristics of cells are used for grouping or classifying the cells into groups. It is noted that, in some aspects, a UE or scheduled entity may be configured to determine the grouping of cells, whereas in other aspects the grouping may be performed by the RAN entity. Further, the grouping may include determining a plurality of groups of cells, wherein each group of the plurality shares common parameters such as the same propagation delay and/or signal quality. In further aspects, it is noted that a group of cells may be a timing advance group (TAG), which is a group of serving cells using the same timing reference cell and the same timing advance value as defined in 3GPP TS 38.321. It is noted that the grouping circuit 840 shown and described below in connection with FIG. 8 may provide a means to group the one or more cells into a group of cells based on the received propagation delay or signal quality information.

According to some aspects, method 700 may further include the process of assigning a respective TAG identifier (TAG ID) to each group of cells as shown at block 706. In certain aspects, the assignment of the TAG ID may be performed in a base station or gNB, but is not necessarily limited to such. Once TAG IDs are assigned to groups of cells, method 700 may further includes time division multiplexing (TDM) at least one of downlink (DL) and uplink (UL) transmissions based on the TAG IDs as shown in block 708. In other aspects, the TDM of UL and DL transmissions may be based on other means of identifying besides a TAG ID. It is noted that the grouping circuit 840 shown and described below in connection with FIG. 8 may provide a means to assign the TAG ID in some aspects. Further, TDM circuit 842 and transceiver 810 shown and described below in connection with FIG. 8 may provide a means to schedule and/or perform TDM of the UL and DL transmissions.

According to further aspects, the grouping of the one or more cells into one or more groups of cells in block 704 may include selecting only cells having substantially the same propagation delays or signal qualities at the at least one UE for inclusion into at least one group of the one or more groups. In other aspects, the grouping of the one or more cells into a group of the one or more groups may be determined based on cells having propagation delays or signal qualities within a predetermined range of propagation delays or signal qualities. receiving at least one of propagation delay or signal quality concerning one or more cells in the wireless communication network from a user equipment (UE).

According to further aspects, method 700 may include that the signal quality is determined based on at least one of a reference signal receive power (RSRP) value, a signal to interference plus noise ratio (SINR) value, or a reference signal received quality (RSRQ) value, where these values may be received from the UE. Moreover, the RSRP, SINR or RSRQ values are derived from one of layer 1 (L1) or layer 3 (L3) signaling received from the UE.

Method 700 may further include receiving at least one of one or more cell IDs, an absolute propagation delay, a differential propagation delay, a signal quality, or a differential signal quality from the at least one UE. Further, the propagation delay or signal quality information is received according to a predefined periodicity. In yet other aspects, method 700 may include that the propagation delay or signal quality information is received in response to a triggering condition. Still further, the triggering condition may include when a change in at least one cell in a group of the one or more groups occurs. Moreover, the particular selection made in block 704 may be communicated from the gNB to one or more UEs via DL channels such as PDCCH or PDSCH, as examples.

Figure 8:
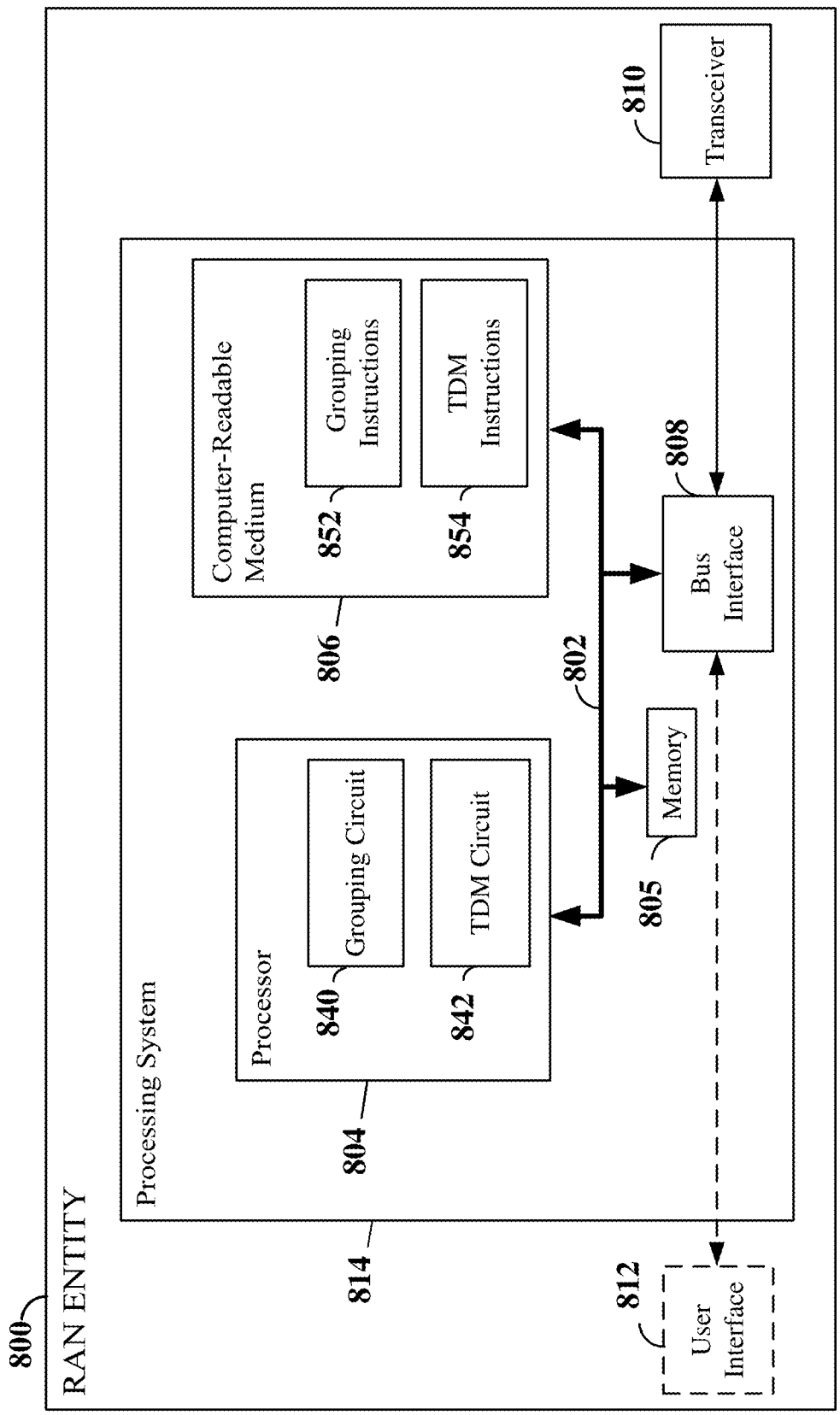
FIG. 8 is a block diagram conceptually illustrating an example of a hardware implementation for a RAN entity according to some aspects.

FIG. 8 is a conceptual block diagram illustrating an example of a hardware implementation for an exemplary RAN or scheduling entity 800 employing a processing system 814. For example, the scheduling entity 800 may be a RAN entity, scheduling entity, base station, or gNB as illustrated in any one or more of FIG. 1-3 or 6.

The RAN entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN entity 800 may be configured to perform any one or more of the functions described herein. That is, the processor 804, as utilized in RAN entity 800, may be used to implement any one or more of the processes and procedures described above and illustrated in FIG. 6 or 7.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further.

A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided. Of course, such a user interface 812 is optional, and may be omitted in some examples, such as in the illustrated RAN entity.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. In some examples, the computer-readable medium 806 may be part of the memory 805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include a grouping circuit 840 configured for various functions, including, for example, receiving the reported information from the UE; namely cell propagation delay or signal quality information via transceiver 810, for example. In an aspect, this process effected by the grouping circuit 840 may include triggering of the UE in some aspects to transmit the information. The grouping circuit 840 may also be configured to receive cell ID information, absolute or differential propagation delays and the signal quality per cell.

In further aspects, the grouping circuit 840 may be configured to group cells based on shared propagation delay or signal quality as was discussed above in connection with process 704 in FIG. 7, as one example. Additionally, multiple groupings or TAGs may be determined by the grouping circuit 840.

In further aspects, the grouping circuit 840 may be configured to assign TAG IDs to one or more groups of cells in an L1/L2-centric inter-cell mobility system based on the received timing information such as propagation delay information and/or signal quality information, as well as contain cell ID, absolute/differential propagation delay and/or signal quality per cell. Additionally, the selection circuitry 840 may be configured to implement any one or more of the functions described previously in relation to FIG. 7, including the processes associated with blocks 702, 74, and 706.

In further aspects, the processor may include TDM circuitry 842 configured for various functions, including, for example, time division multiplexing UL and DL transmissions based on the TAG IDs. For example, the TDM circuitry 842 may be configured to implement one or more of the functions described previously in relation to FIG. 7, including the processes associated with block 708. The TDM circuitry 842 may operate in conjunction with transceiver 810 to implement the various TDM transmissions (either UL and/or DL).

In one or more examples, the computer-readable storage medium 806 may include grouping instructions or software 852 configured for various functions of grouping circuit 840, including, for example, cell grouping based on timing or signal quality information and assigning TAG IDs to the groups in an L1/L2-centric inter-cell mobility system. For example, the selection instruction software 852 may be configured to implement one or more of the functions described above in relation to FIG. 7, including, e.g., blocks 702, 704, and 706.

In one or more further examples, the computer-readable storage medium 806 may include TDM instruction software 854 configured for various functions, including, for example, TDM for UL and DL transmissions in the communication system. For example, the TDM instruction software 854 may be configured to implement one or more of the functions described above in relation to FIG. 7, including, e.g., block 708.

In one configuration, the RAN entity 800 includes means for performing the various functions and processes described in relation to FIG. 6 or 7. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIG. 1-3, or 6, and utilizing, for example, the processes and/or algorithms described herein in relation to FIG. 6 or 7.

Figure 9:
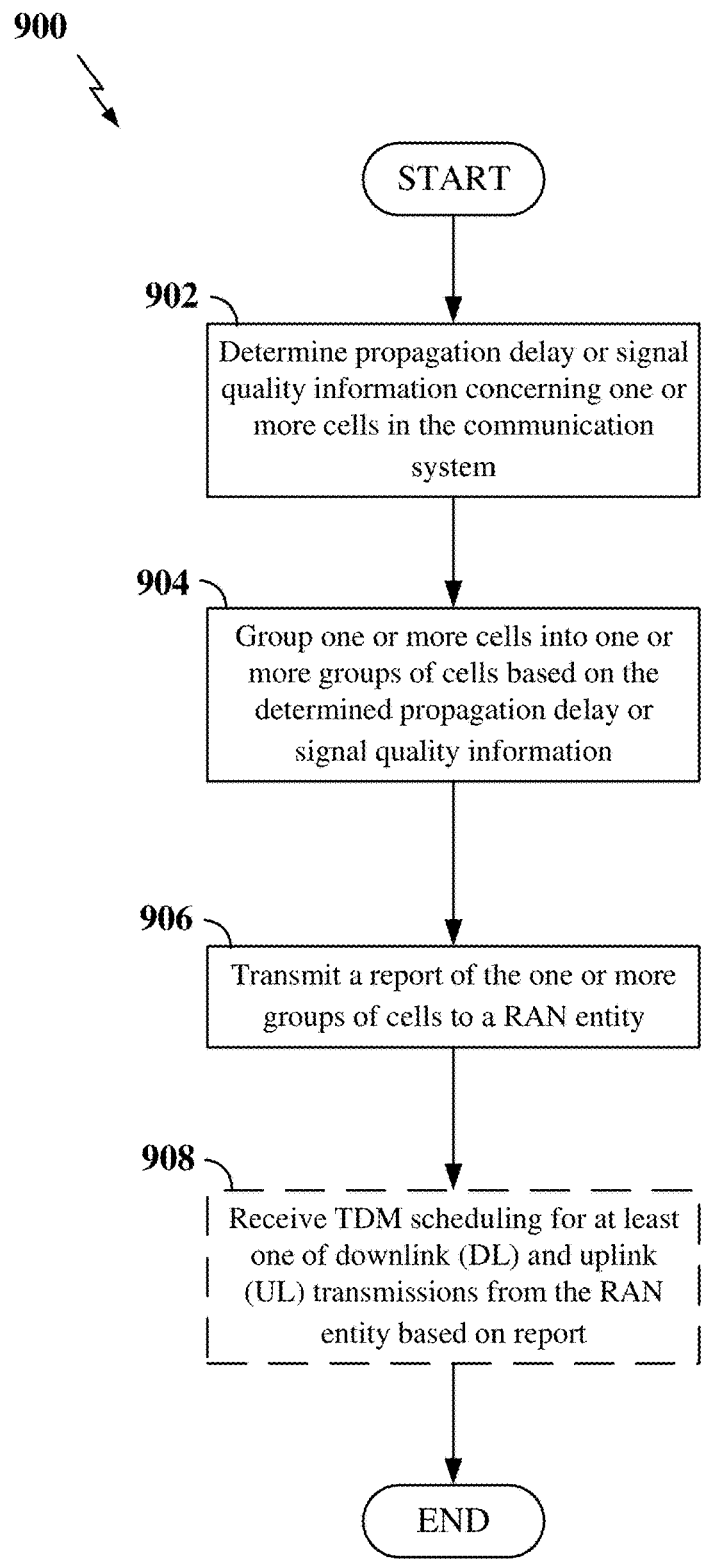
FIG. 9 illustrates a flow chart of another exemplary method for grouping cells (e.g., determining TAGs) based on various characteristics according to some aspects.

FIG. 9 illustrates a flow chart of an exemplary method 900 for grouping cells in a communication system supporting inter-cell mobility based on various characteristics in accordance with some aspects. As described below, some or all illustrated features may be omitted in a particular implementation within the scope of the present disclosure, and some illustrated features may not be required for implementation of all examples. In some examples, the method 900 may be carried out by a scheduled entity such as UE as illustrated in any of FIGS. 1-3, 6, and 10. In other examples, the method may be carried out by any suitable apparatus or means for carrying out the functions or algorithm described below.

Method 900 includes determining at least one of propagation delay or signal quality information for one or more cells in the communication system as shown in block 902. In an example, the determination of the delay or signal quality is based on measurements made within the UE. For example, the cell timing/quality reporting circuit 1040 and transceiver 1010 shown and described below in connection with FIG. 10 may provide a means to determine at least one of propagation delay or signal quality information in a UE.

Further, method 900 includes grouping the one or more cells into one or more groups of cells based on the determined propagation delay or signal quality information, wherein cells having shared propagation delays or signal quality are grouped together as shown at block 904. In an aspect, the grouping may include selecting only those cells having substantially the same propagation delays or signal quality at the UE for inclusion into a group. In this manner, the UE may establish groupings that may be used by a RAN entity, for example, to determine TAGs according to some aspects. In other aspects, rather than limiting grouping to delays and/or signal quality being the same, the grouping the one or more cells into one of the one or more groups of cells may be determined based on cells having propagation delays or signal quality at the UE within a predetermined range of propagation delays or signal qualities for inclusion into the one of the one or more groups of cells. In an example, the grouping circuit 1042 shown and described below in connection with FIG. 10 may provide a means to grouping the one or more cells into one or more groups of cells based on the determined propagation delay or signal quality information.

At block 906, method 900 includes transmitting a report of the grouped one or more groups of cells to a RAN entity. In some aspects, the UE may be configured to group the one or more cells into one or more TAGs, which are placed in the report. In further aspects, it is noted that the signal quality is determined at the UE based on at least one of a reference signal receive power (RSRP) value, a signal to interference plus noise ratio (SINR) value, or a reference signal received quality (RSRQ) value. In yet further aspects, the transmission may include transmitting the RSRP, SINR or RSRQ values to the RAN entity using one of layer 1 (L1) or layer 3 (L3) signaling, which may further be included in the transmission of the report. In yet further examples, the transmission of the report to the RAN entity may include transmitting at least one of one or more cell IDs, an absolute propagation delay, a differential propagation delay, a signal quality, or a differential signal quality. In some aspects, it is noted that the grouping circuit 1042 in conjunction with transceiver 1010 shown and described below in connection with FIG. 10 may provide a means to transmit the grouped one or more groups of cells to the RAN entity.

In other examples, the determination of the propagation delay or signal quality information may be performed according to a predefined periodicity (i.e., a periodic determination). In still other aspects, the determination of the propagation delay or signal quality information may be performed in response to a triggering condition. The triggering condition may include a change in at least one cell in a group of the one or more groups according to one example.

At block 906, method 900 includes transmitting a report of the grouped one or more groups of cells to a RAN entity. In an aspect, Further, method 900 may include receiving time division multiplexing (TDM) scheduling information from the RAN entity for transmission of at least one of downlink (DL) and uplink (UL) transmissions based on the transmitted one or more groups. In some aspects, it is noted that the grouping circuit 1042 in conjunction with transceiver 1010 shown and described below in connection with FIG. 10 may provide a means to transmit the grouped one or more groups of cells to the RAN entity.

Further, method 900 includes receiving, from the RAN entity, TDM scheduling for UL (and DL transmissions) based on the report transmitted in block 906 as shown at 908. In an aspect, the TDM scheduling is determined by the RAN entity in accordance with the processes disclosed above in connection with the block 708 in FIG. 7. In some aspects, it is noted that the transceiver 1010 shown and described below in connection with FIG. 10 may provide a means to receive and implement TDM scheduled UL and DL transmissions.

Figure 10:
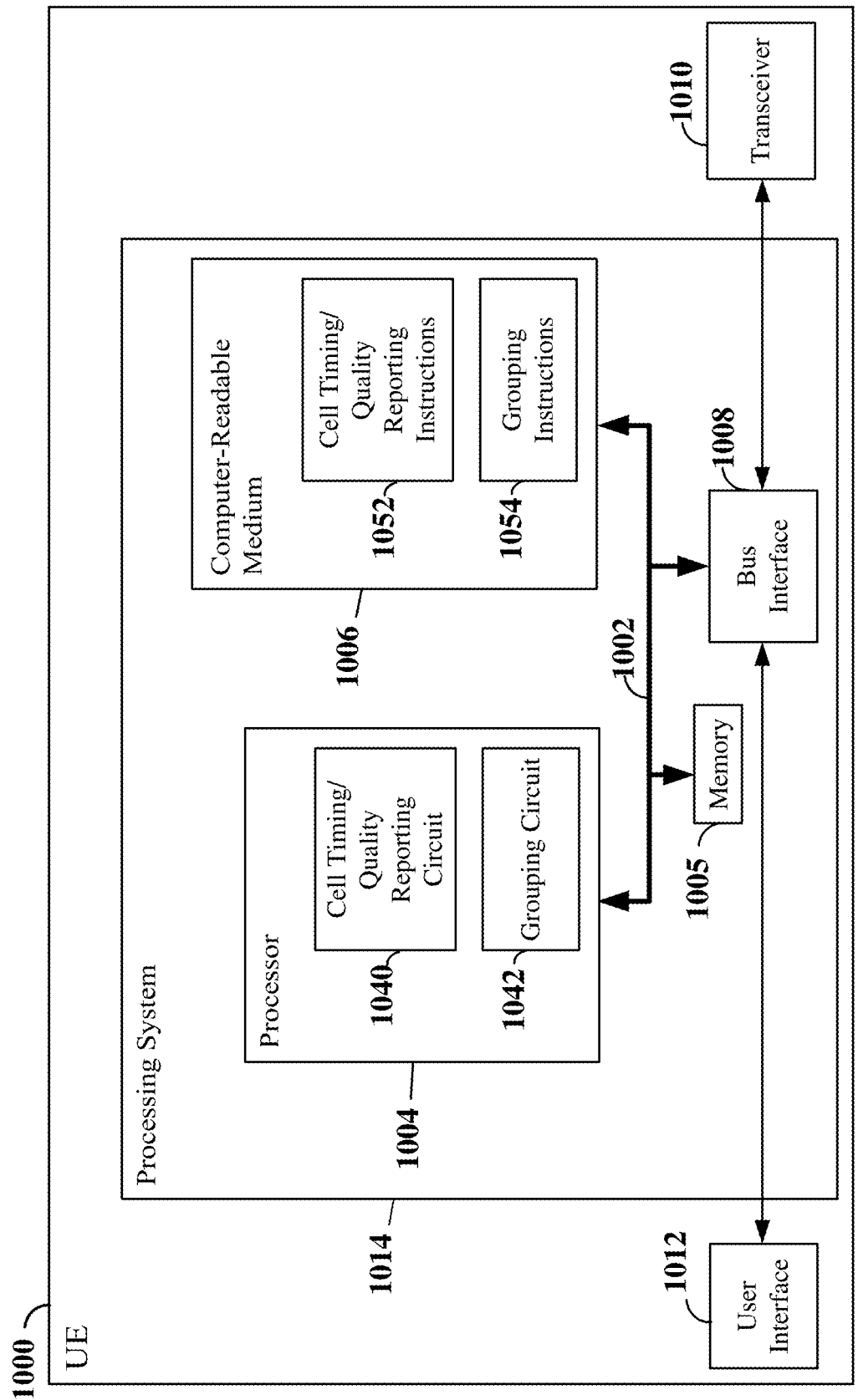
FIG. 10 is a block diagram conceptually illustrating an example of a hardware implementation for a UE according to some aspects.

FIG. 10 is a conceptual diagram illustrating an example of a hardware implementation for an exemplary UE 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a user equipment (UE) as illustrated in any one or more of FIG. 1-3 or 6.

The processing system 1014 may be substantially the same as the processing system 814 illustrated in FIG. 8, including a bus interface 1008, a bus 1002, memory 1005, a processor 1004, and a computer-readable medium 1006. Furthermore, the UE 1000 may include a user interface 1012 and a transceiver 1010 substantially similar to those described above in connection with FIG. 8. That is, the processor 1004, as utilized in a UE 1000, may be used to implement one or more of the processes described previously in connection with the method 900 disclosed in FIG. 9.

In some aspects of the disclosure, the processor 1004 may include cell timing/quality transmit circuitry 1040 configured for various functions, including, for example, transmitting cell timing information (e.g., propagation delay) and signal quality information to the RAN entity (e.g., 800). For example, the cell timing/quality transmit circuitry 1040 may be configured to implement the functions of determining the cell timing or signal quality, and then causing transmission to a RAN entity via transceiver 1010 and also shown by blocks 902 and 906 in FIG. 9. In other aspects of the disclosure, the processor 1004 may also include a grouping circuitry 1042 configured for various functions including grouping of cells based on common characteristics using the determined timing and signal quality information in other aspects, and also shown by block 904 in FIG. 9.

In other aspects, the computer-readable storage medium 1006 may include reference information transmit instruction software 1052 configured for various functions, including, for example, determining the cell timing or signal quality, and then causing transmission to a scheduling entity, gNB, or base station via transceiver 1010 and also shown by blocks 902 and 906 in FIG. 9. In other aspects of the disclosure, the computer-readable storage medium 1006 may include reference information transmit instruction software 1054 configured for various functions, including, for example, grouping of cells based on common characteristics using the determined timing and signal quality information in other aspects, and also shown by block 904 in FIG. 9.

In one configuration, the UE 1000 includes means for performing the various functions and processes described in relation to FIGS. 6 and 9. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIG. 1-3, 6, or 10, and utilizing, for example, the processes and/or algorithms described herein in relation to FIGS. 6 and 9.

The following provides an overview of aspects of the present disclosure:

Aspect 1: A method for wireless communication at a radio access network (RAN) entity in a wireless communication network supporting inter-cell mobility, the method comprising: receiving at least one of propagation delay or signal quality concerning one or more cells in the wireless communication network from a user equipment (UE); grouping at least a portion of the one or more cells into a group of cells based on the received propagation delay information or the signal quality information, wherein the cells in the group of cells have substantially the same propagation delay or signal quality; and time division multiplexing (TDM) at least one of downlink (DL) and uplink (UL) transmissions based on the group of cells.

Aspect 2: The method of aspect 1, wherein the grouping of the at least a portion of the one or more cells into the group of cells further comprises: assigning a respective timing advance group (TAG) ID to the group of cells.

Aspect 3: The method of aspect 1 or 2, wherein the grouping of the at least a portion of the one or more cells into the group of cells comprises: selecting only cells of the one or more cells having substantially the same propagation delay or signal quality at the UE.

Aspect 4: The method of any of aspects 1 through 3, wherein the grouping of the at least a portion of the one or more cells into the group of cells further comprises: determining the group of cells based on cells having propagation delays or signal qualities within a predetermined range of propagation delays or a predetermined range of signal quality.

Aspect 5: The method of any of aspects 1 through 4, wherein the signal quality is based on at least one of a reference signal receive power (RSRP) value, a signal to interference plus noise ratio (SINR) value, or a reference signal received quality (RSRQ) value.

Aspect 6: The method of any of aspects 1 through 5, wherein the RSRP, SINR or RSRQ values are derived from one of layer 1 (L1) or layer 3 (L3) signaling received from the UE.

Aspect 7: The method of any of aspects 1 through 6, further comprising: receiving at least one of one or more cell IDs, an absolute propagation delay, a differential propagation delay, an absolute signal quality, or a differential signal quality from the UE.

Aspect 8: The method of any of aspects 1 through 7, wherein the propagation delay or signal quality is received according to a predefined periodicity.

Aspect 9: The method of any of aspects 1 through 8, wherein the timing propagation delay or signal quality is received in response to a triggering condition.

Aspect 10: The method of any of aspects 1 through 9, wherein the triggering condition comprises a change in at least one cell in the group of cells.

Aspect 11: The method of any of aspects 1 through 10, further comprising: grouping at least a first portion of the one or more cells into a first group of cells and a second portion of the one or more cells into a second group cells based on the received propagation delay information or the signal quality information, wherein the cells in the group of cells have substantially the same propagation delay or signal quality; and time division multiplexing (TDM) at least one of downlink (DL) and uplink (UL) transmissions based on the first group of cells and the second group of cells.

Aspect 12: The method of any of aspects 1 through 11, wherein the group of cells comprises a timing advance group (TAG).

Aspect 13: A method for wireless communication in a user equipment (UE) in a wireless communication system supporting inter-cell mobility, the method comprising: determining at least one of propagation delay or signal quality information for one or more cells in the communication system; grouping the one or more cells into one or more groups of cells based on the determined propagation delay or signal quality information, wherein cells having shared propagation delays or signal quality are grouped together; and transmitting a report of the grouped one or more groups of cells to a RAN entity.

Aspect 14: The method of aspect 13, further comprising: receiving time division multiplexing (TDM) scheduling information from the RAN entity for transmission of at least one of downlink (DL) and uplink (UL) transmissions based on the report.

Aspect 15: The method of aspect 13 or 14, wherein grouping the one or more cells into one of the one or more groups of cells includes selecting only cells having substantially the same propagation delays or signal quality at the UE for inclusion into the one of the one or more groups of cells.

Aspect 16: The method of any of aspects 13 through 15, further comprising grouping the one or more cells into one of the one or more groups of cells is determined based on cells having propagation delays or signal quality at the UE within a predetermined range of propagation delays or signal qualities for inclusion into the one of the one or more groups of cells.

Aspect 17: The method of any of aspects 13 through 16, wherein the signal quality is determined based on at least one of a reference signal receive power (RSRP) value, a signal to interference plus noise ratio (SINR) value, or a reference signal received quality (RSRQ) value.

Aspect 18: The method of any of aspects 13 through 17, further comprising: transmitting the RSRP, SINR or RSRQ values to the RAN entity using one of layer 1 (L1) or layer 3 (L3) signaling in the report.

Aspect 19: The method of any of aspects 13 through 18, further comprising: transmitting at least one of one or more cell IDs, an absolute propagation delay, a differential propagation delay, a signal quality, or a differential signal quality to the RAN entity.

Aspect 20: The method of any of aspects 13 through 19, further comprising determining the propagation delay or signal quality information according to a predefined periodicity.

Aspect 21: The method of any of aspects 13 through 20, further comprising determining the propagation delay or signal quality information in response to a triggering condition.

Aspect 22: The method of any of aspects 13 through 21, wherein the triggering condition comprises a change in at least one cell in a group of the one or more groups.

Aspect 23: A radio access network (RAN) entity configured for wireless communication comprising a processor, and a memory coupled to the processor, the processor and memory configured to perform a method of any one of aspects 1 through 12.

Aspect 24: A UE configured for wireless communication comprising a processor, and a memory coupled to the processor, the processor and memory configured to perform a method of any one of aspects 13 through 22.

Aspect 25: An apparatus configured for wireless communication comprising at least one means for performing a method of any one of aspects 1 through 12 or 13 through 22.

Aspect 26: A non-transitory computer-readable medium storing computer-executable code, comprising code for causing an apparatus to perform a method of any one of aspects 1 through 12 or 13 through 22.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication in a user equipment (UE) in a wireless communication system supporting inter-cell mobility, the method comprising:

determining based at least in part on measurements made by the UE at least one of propagation delay or signal quality information for a plurality of cells in the communication system;

grouping, by the UE, the plurality of cells into one or more groups of cells based on the determined propagation delay or signal quality information, wherein cells having shared propagation delays or signal quality are grouped together; and transmitting from the UE to a radio access network (RAN) entity a report of the grouped one or more groups of cells having shared propagation delays or signal quality.

2. The method of claim 1, further comprising:
receiving time division multiplexing (TDM) scheduling information from the RAN entity for transmission of at least one of downlink (DL) and uplink (UL) transmissions based on the report.

3. The method of claim 1, wherein grouping the plurality of cells into one of the one or more groups of cells includes selecting only cells having substantially the same propagation delays or signal quality at the UE for inclusion into the one of the one or more groups of cells.

4. The method of claim 1, further comprising grouping the plurality of cells into one of the one or more groups of cells is determined based on cells having propagation delays or signal quality at the UE within a predetermined range of propagation delays or signal qualities for inclusion into the one of the one or more groups of cells.

5. The method of claim 1, wherein the signal quality is determined based on at least one of a reference signal receive power (RSRP) value, a signal to interference plus noise ratio (SINR) value, or a reference signal received quality (RSRQ) value.

6. The method of claim 5, further comprising:
transmitting the RSRP, SINR or RSRQ values to the RAN entity using one of layer 1 (L1) or layer 3 (L3) signaling.

7. The method of claim 1, further comprising:
transmitting at least one of one or more cell IDs, an absolute propagation delay, a differential propagation delay, a signal quality, or a differential signal quality to the RAN entity in the report.

8. The method of claim 1, further comprising determining the propagation delay or signal quality information according to a predefined periodicity.

9. The method of claim 1, further comprising determining the propagation delay or signal quality information in response to a triggering condition.

10. The method of claim 9, wherein the triggering condition comprises a change in at least one cell in a group of the one or more groups.

11. A user equipment (UE) configured for wireless communication, comprising:
a processor;
a transceiver communicatively coupled to the processor; and
a memory communicatively coupled to the processor,
wherein the processor and memory are configured to:
determine based at least in part on measurements made by the UE at least one of a propagation delay or a signal quality information for a plurality of cells in a communication system;
group the plurality of cells into one or more groups of cells based on the determined propagation delay or signal quality information, wherein cells having shared propagation delays or signal quality are grouped together; and
transmit from the UE to a radio access network (RAN) entity a report of the grouped one or more groups of cells having shared propagation delays or signal quality.

12. The UE of claim 11, wherein the processor and memory are further configured to:
group the plurality of cells into one of the one or more groups of cells by selecting cells having substantially the same propagation delays or signal quality at the UE for inclusion into the one of the one or more groups of cells.

13. The UE of claim 11, wherein the processor and memory are further configured to:
receive time division multiplexing (TDM) scheduling information from the RAN entity for transmission of at least one of downlink (DL) and uplink (UL) transmissions based on the report.

14. The UE of claim 11, wherein the processor and memory are further configured to:
group the plurality of cells into one of the one or more groups of cells based on cells having propagation delays or signal quality at the UE within a predetermined range of propagation delays or signal qualities for inclusion into the one of the one or more groups of cells.

15. The UE of claim 11, wherein the signal quality is determined based on at least one of a reference signal receive power (RSRP) value, a signal to interference plus noise ratio (SINR) value, or a reference signal received quality (RSRQ) value.

16. The UE of claim 15, wherein the processor and memory are further configured to:
transmit the RSRP, SINR or RSRQ values in the report to the RAN entity using one of layer 1 (L1) or layer 3 (L3) signaling.

17. The UE of claim 11, wherein the processor and memory are further configured to:
transmit in the report at least one of one or more cell IDs, an absolute propagation delay, a differential propagation delay, a signal quality, or a differential signal quality to the RAN entity.

* * * * *